Inventors
J. Schier
K. Petschenig
A. Peinl

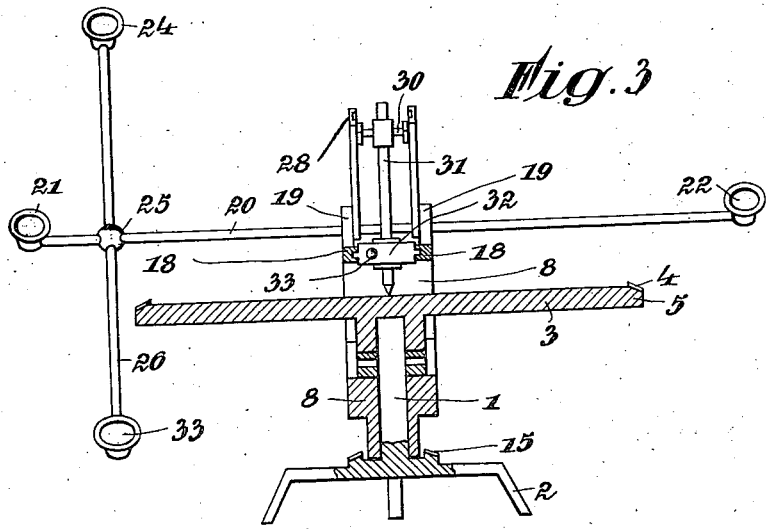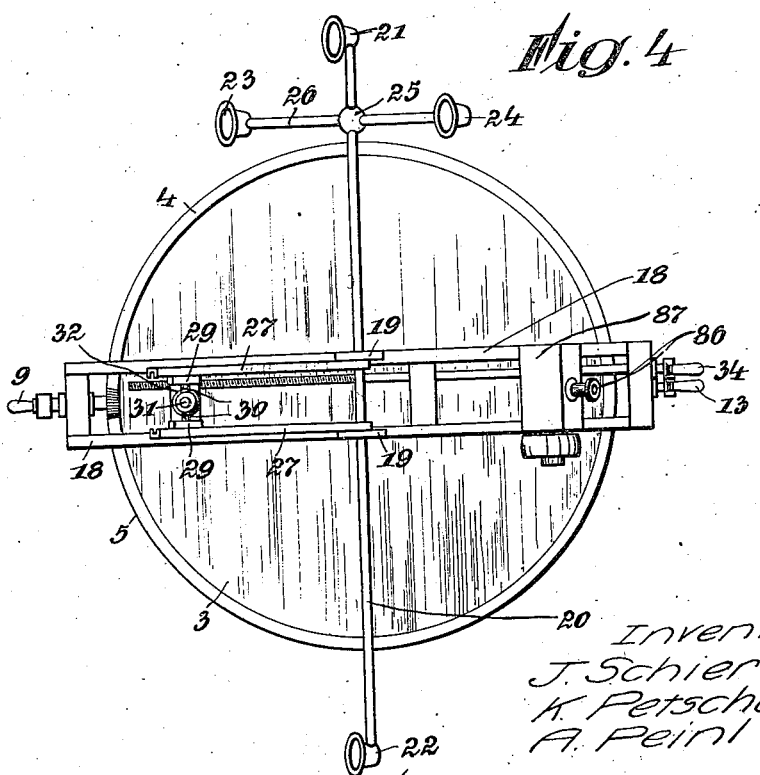

Patented Mar. 21, 1933

1,902,727

UNITED STATES PATENT OFFICE

JOHANN SCHIER, KARL PETSCHENIG, AND ANTON PEINL, OF VIENNA, AUSTRIA, ASSIGNORS TO THE FIRM OPTISCHE ANSTALT C. P. GOERZ AKTIENGESELLSCHAFT, AKCIOVA SPOLECNOST K. P. GOERZ, OPTICKY USTAV, IN BRATISLAVA, CZECHOSLOVAKIA

APPARATUS FOR DETERMINING THE POSITION OF AIRCRAFT NOT VISIBLE WITH THE NAKED EYE

Application filed November 15, 1924, Serial No. 750,215, and in Czechoslovakia November 16, 1923.

Experience teaches that it is very difficult and in fact almost impossible to detect an aircraft flying high in the air at night by means of the pencil of light from a reflector, without the aid of suitable means. Even with the aid of the known acoustic direction detectors and other acoustic apparatus by which the direction of the aircraft from the observer may be roughly estimated by the observer from merely subjective impressions, it takes a long time before the light of the reflector can be thrown on the aircraft, if this be possible at all.

The object of the present invention is to provide an apparatus permitting finding in a comparatively short time, an aircraft flying in the air and not visible with the naked eye, more particularly at night time, by means of the light projected by a reflector or any other optical device.

The essence of the invention consists in that sound receivers held during a predetermined period of observation with their acoustic axis in the direction of the sound actuate an indicating device which indicates the angle (roof-angle) of the plane (roof plane) passing through the point of observation and the horizontal element of the trajectory of the aircraft, as well as the angle (course angle) between the intersection of the plane with the horizon and some given direction in a horizontal plane and these data are utilized for adjusting a device (reflector, telescope or the like) in the said plane (roof plane).

By this method it is possible to account for the speed of the aircraft, which is considerable as compared with the speed of the propagation of sound, by holding the reflector properly ahead of the acoustic line to the aircraft in the plane through the point of observation and the horizontal trajectory of the aircraft, which plane is called herein the "roof plane" which makes the "roof angle" with the horizontal, and the intersection of which roof plane with the horizontal plane makes the "course angle" with any given direction (for instance the north south direction). If now according to the invention the latter angle is adjusted on the horizontal circular scale of a horizontally rotatable reflector suspended in gimbals and the "roof angle" is adjusted on the vertical circular scale of the outer gimbal axis of a gimbal ring carrying the reflector, then the inner gimbal axis which is at right angles to the outer gimbal axis is also at right angles to the said "roof plane" so that the optical axis of the reflector which is at right angles to the inner gimbal axis is permanently in the "roof plane" when the reflector is turned round the inner gimbal axis, and therefore must pass through the aircraft in such plane.

The means by which the acoustic line of direction extending from the observer to the aircraft is determined, consist according to the invention of a double binaural device.

The annexed drawings show one embodiment of the invention by way of example.

Fig. 3 shows the same arrangement in front elevation, partly in section.

Fig. 4 shows the same arrangement in plan view.

Figure 1:
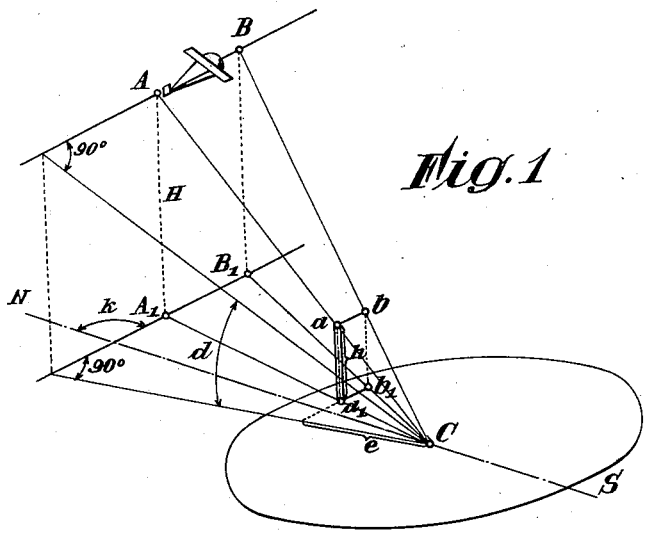
Fig. 1 is a diagrammatic illustration of the theoretical basis of the method for determining the course angle and the roof angle at any instant of the horizontal rectilinear flight.

In Fig. 1 A B is the horizontal rectilinear path through which the aircraft flies in a given period of time. $A_1 B_1$ is the projection thereof on the horizon of the point of observation C and therefore $A A_1 = B B_1 = x$, the height of the path of flight. The plane passing through the path A B and the point of observation called "roof plane" is inclined to the horizon by the angle $d$ (roof angle) while the line of intersection of the roof plane with the horizontal plane is parallel to the projection $A_1 B_1$ and makes an angle K with any desired zero line, for instance with the north south direction S C N. In order to practically determine these two angles, assume that the two triangles A B C, $A_1 B_1$ C are mechanically reproduced at any reduced scales by mechanically fixing at any desired but constant height $h$ above the horizon passing through the point of observation C, a point $a$, and adjusting it into the direction A C. This adjustment is effected by moving a vertical rod $a\ a_1$ of a predetermined length $h$ parallel to itself in such manner that the point $a$ is permanently held in the line leading to the aircraft by simultaneously moving the rod $a\ a_1$ tangentially and radially.

If now on the surface of the map table, adapted to turn round a vertical axis and serving as the plane of projection, a series of parallel lines is drawn at suitable distances from each other, it will always be possible to so turn the table that on adjusting the point $a$ in the line to the target, the bottom end $a_1$ is constantly on one of the parallel course direction lines or moves parallel thereto. From the distance $e$ of this line from the axis of the table and the selected length $h$ of the rod $a\ a$, the roof angle is found.

$$d = arc.\tan\frac{h}{e}.$$

In order to permit the roof angle to be rapidly determined the course direction lines are drawn on the surface of the table at such distances $c = \cot d$ from the axis of the table that the geometrical locus of the projections of the point $a$ is numbered correspondingly to the values of the roof angles by degrees while the course direction angles can be read on the periphery of the table from a selected zero point by means of a pointer on the pivot of the stand.

Figure 2:
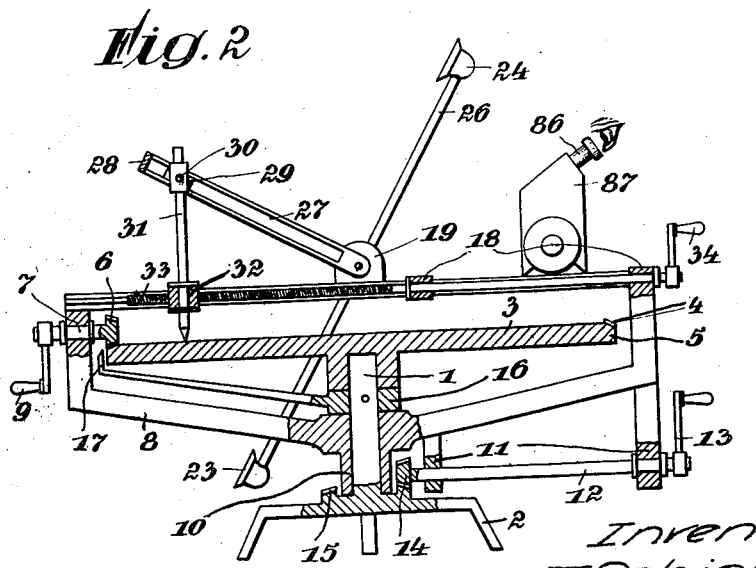
Fig. 2 shows a constructional form of the mechanical arrangement required therefor, in side elevation, partly in section.

The mechanical apparatus resulting from this theoretical basis is seen in Figs. 2 to 4. On the pivot 1 of the stand 2 is loosely mounted the hub of a map table 3, horizontally rotatable, the periphery of which is provided with bevel teeth 4 and a scale 5 for the azimuth angles. A bevel pinion 6 engages in the bevel teeth, the shaft 7 of which is journaled in a frame 8 and may be rotated by a handle 9. The frame 8 is likewise loosely mounted on the vertical pivot of the stand by its hub 10 and carries by means of two hangers 11 a radial horizontal shaft 12 carrying on its outer end a handle 13, by the operation of which the bevel wheel 14 can be rotated, which latter is mounted on the inner end of said shaft. As the latter pinion engages in a ring of bevel teeth 15 secured to the stand 2, the frame 8 is rotated horizontally by the revolution of the bevel wheel 14. Between the hub of said frame and that of the map table, a ring 16 is secured to the pivot which ring carries a pointer 17, whereby the azimuth of the map table can be read on the peripheral scale 5. The yoke 18 extending diametrically above the map table is itself constructed as a frame and carries by means of the two bearings 19 a long diametrically arranged tube 20 adapted to turn round its horizontal axis, which tube serving as the azimuthal direction basis, carries at its two ends the two microphones 21 and 22 pointing in the same direction. Between these microphones a second tube 26 is arranged which is carried by a circular hub 25 and adapted to rotate in a vertical plane as an acoustic basis for the altitude direction, the tube 26 carries at its two ends the two microphones 23, 24 pointing in the same direction. Thus the four microphones constitute two binaural sound receiving devices in a plane parallel to the acoustic base plane (20, 26) and therefor give the direction from which the sound comes or the direction of the incoming sound waves, whenever the plane of these sound receiving devices is properly adjusted, as is well known, the direction of the incoming sound waves being perpendicular to the acoustic base plane 20, 26. Now on the horizontal supporting tube 20 the two rules 27 are secured which are provided at their inner edges with longitudinal grooves and which are at right angles to the base plane (20, 26) and are connected at their top ends by a cross tie 28 to form a rigid frame. In each of the longitudinal grooves of these rules is mounted a sliding prism 29 provided with a horizontal bore for a pin, into each of which bores engages a lateral pin 30 of a vertical rod 31. This rod, having a point at its bottom end, is held in a prismatic sliding piece 32 which is guided diametrically with relation to the map table by means of the inner grooves of the yoke 18 and is provided with a female thread into which engages a screw spindle 33 journalled in the yoke 18 and adapted to be rotated by the handle 34. Thus by such rotation the vertical rod 31 is moved parallel to itself radially with relation to the map table whereby a change of the inclination of the guide rules 27 is brought about, and thus also the microphone carrying tube 20 is turned round its horizontal axis, and in this way a change of the altitude direction base 26 is effected.

The acoustic azimuth of the aircraft is given by a horizontal line perpendicular to the tube 20 and thus may be readily read on the circle 5.

What we claim is:
In an apparatus for determining and following the path of an object not visible with the naked eye, but producing a sound, the said object moving substantially in a straight horizontal line, a unitary structure located at the point of observation and comprising a double binaural device for determining the direction of the incoming sound waves, means cooperating with the said binaural device for keeping the plane of the sound receiving orifices of the said binaural device perpendicular to the said incoming sound waves moving in the so-called roof plane, and a horizontal rotatable table for plotting a line parallel to the direction of flight of the aircraft, the said table being provided with parallel lines, the distance of the said lines from the center of the table being proportional to the cotangent of the angle of the roof plane relatively to a horizontal plane, and means on said first-mentioned means and cooperating with said table for defining a rectangular rotatable triangle having a constant height and a hypothenuse of variable length, the said hypothenuse being arranged at a right angle to the binaural device whereby the said hypothenuse lies constantly in the direction of the sound waves.

In testimony whereof we have affixed our signatures.

JOHANN SCHIER.
KARL PETSCHENIG.
ANTON PEINL.